(12) United States Patent
Qi et al.

(10) Patent No.: US 11,423,333 B2
(45) Date of Patent: Aug. 23, 2022

(54) MECHANISMS FOR CONTINUOUS IMPROVEMENT OF AUTOMATED MACHINE LEARNING

(71) Applicant: International Business Machines Corporation, Armonk, NY (US)

(72) Inventors: Haode Qi, Cambridge, MA (US); Ming Tan, Malden, MA (US); Ladislav Kunc, Cambridge, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 16/829,055

(22) Filed: Mar. 25, 2020

(65) Prior Publication Data

US 2021/0304055 A1 Sep. 30, 2021

(51) Int. Cl.
*G06F 17/00* (2019.01)
*G06N 20/00* (2019.01)
(Continued)

(52) U.S. Cl.
CPC .......... *G06N 20/00* (2019.01); *G06F 17/18* (2013.01); *G06K 9/6256* (2013.01); *G06N 3/084* (2013.01)

(58) Field of Classification Search
CPC ........ G06N 20/00; G06N 3/084; G06F 17/18; G06F 3/04847; G06K 9/6256; H04L 67/06
(Continued)

(56) References Cited

U.S. PATENT DOCUMENTS 7,894,677 B2 2/2011 Konig et al.
8,885,928 B2 11/2014 Forman
(Continued)

FOREIGN PATENT DOCUMENTS

CN 105138538 B 8/2018
CN 108959265 A 12/2018
(Continued)

OTHER PUBLICATIONS

List of IBM Patents or Patent Applications Treated as Related, Mar. 25, 2020, 2 pages.
(Continued)

*Primary Examiner* — Jason T Edwards
(74) *Attorney, Agent, or Firm* — Stephen J. Walder, Jr.; Brian Welle

(57) ABSTRACT

Mechanisms are provided for optimizing an automated machine learning (AutoML) operation to configure parameters of a machine learning model. AutoML logic is configured based on an initial default value and initial range for sampling of a parameter of the machine learning (ML) model and an initial AutoML process is executed on the ML model based on a plurality of datasets comprising a plurality of domains of data elements, utilizing the initially configured AutoML logic. For each domain, a cross-dataset default value and cross-dataset value range are derived from results of the execution of the initial AutoML process. For each domain, an entry is stored in a data structure, the entry storing the derived cross-dataset default value and cross-dataset value range for the domain. The AutoML logic performs a subsequent AutoML process on a new dataset based on one or more entries of the data structure.

20 Claims, 6 Drawing Sheets

(51) Int. Cl.
  *G06F 17/18* (2006.01)
  *G06K 9/62* (2022.01)
  *G06N 3/08* (2006.01)
(58) Field of Classification Search
  USPC .......................................................... 706/12
  See application file for complete search history.

(56) References Cited

U.S. PATENT DOCUMENTS

| | | | |
|---|---|---|---|
| 9,940,323 | B2 | 4/2018 | Boyer et al. |
| 10,402,723 | B1 | 9/2019 | Silberman et al. |
| 10,417,350 | B1 | 9/2019 | Mohamed et al. |
| 10,484,399 | B1 | 11/2019 | Curtin |
| 10,489,438 | B2 | 11/2019 | Bhatt et al. |
| 2010/0169243 | A1 | 7/2010 | Su et al. |
| 2016/0182558 | A1 | 6/2016 | Tripp |
| 2018/0114142 | A1 | 4/2018 | Mueller |
| 2018/0225280 | A1 | 8/2018 | Dugan |
| 2018/0300576 | A1 | 10/2018 | Dalyac et al. |
| 2018/0375922 | A1* | 12/2018 | Nemati ................. H04L 67/141 |
| 2019/0034823 | A1 | 1/2019 | Thapliyal et al. |
| 2019/0095819 | A1 | 3/2019 | Varadarajan et al. |
| 2019/0266513 | A1 | 8/2019 | Eban et al. |
| 2020/0219627 | A1* | 7/2020 | Consoli ................. G16H 50/20 |

FOREIGN PATENT DOCUMENTS

| | | | |
|---|---|---|---|
| CN | 109308318 | A | 2/2019 |
| CN | 109543031 | A | 3/2019 |
| CN | 109753566 | A | 5/2019 |
| CN | 110032646 | A | 7/2019 |

OTHER PUBLICATIONS

"Automated Machine Learning, What is Automated Machine Learning?", DataRobot, Artificial Intelligence Wiki, 2020, accessed online Feb. 17, 2020, 5 pages.

Balaji, Adithya, "Benchmarking Automatic Machine Learning Frameworks", arVix.org, arXiv:1808.06492v1 [cs.LG], Aug. 17, 2018, 9 pages.

Feurer, Matthias et al., "Efficient and Robust Automated Machine Learning", Advances in Neural Information Processing Systems 28 (NIPS 2015), Dec. 7-12, 2015, 9 pages.

He, Xin et al., "AutoML: A Survey of the State-of-the-Art", arVix.org, arXiv:1908.00709v2 [cs.LG], Aug. 14, 2019, 17 pages.

Ikonomakis, M et al., "Text Classification Using Machine Learning Techniques", WSEAS Transactions on Computers, Issue 8, vol. 4, Aug. 2005, pp. 966-974, 10 pages.

Kim, Sang-Bum et al., "Some Effective Techniques for Naive Bayes Text Classification", IEEE Transactions on Knowledge and Data Engineering, vol. 18, No. 11, Nov. 2006, pp. 1457-1466, 10 pages.

Kotthoff, Lars et al., "Auto-WEKA 2.0: Automatic model selection and hyperparameter optimization in WEKA", Journal of Machine Learning Research 17 (2016) 1-5, Published Nov. 2016, 5 pages.

Nicholson, Chris, "A.I. Wiki, A Beginner's Guide to Automated Machine Learning & AI", Pathmind Inc., 2019, accessed online Feb. 17, 2020, 8 pages.

Scheidegger, Florian M et al., "Automatic Determination of Cognitive Models for Deployment at Computerized Devices Having Various Hardware Constraints", filed Dec. 12, 2018, U.S. Appl. No. 16/217,760.

Thomas, Gegi et al., "Creating Optimized Machine-Learning Models", filed Dec. 11, 2018, U.S. Appl. No. 16/216,138.

* cited by examiner

MECHANISMS FOR CONTINUOUS IMPROVEMENT OF AUTOMATED MACHINE LEARNING

BACKGROUND

The present application relates generally to an improved data processing system, apparatus, and method for continuous improvement of automated machine learning. More specifically, the present application provides some illustrative embodiments that relate to improved mechanisms for continuous improvement on cross-domain automated machine learning for classification operations.

Different conventional techniques exist to create machine learning models and neural network models. The basic prerequisites across existing approaches include having a dataset upon which to train the machine learning model, as well as basic knowledge of ML model synthesis, neural network architecture synthesis, and coding skills. Conventionally, for obtaining models with higher refined accuracies, specialized knowledge is needed to hand-tune a machine learning model or neural network for optimal accuracy. This results in a high barrier to successfully leveraging Artificial Intelligence (AI) and/or neural network or machine learning model architectures as a new class of solutions to enterprise problems.

Automated machine learning (AutoML) is the process of automating the process of applying machine learning to real-world problems. AutoML was proposed as an artificial intelligence-based solution to the ever-growing challenge of applying machine learning. The high degree of automation in AutoML allows non-experts to make use of machine learning models and techniques without requiring these users to become an expert in the particular field first. Conventional techniques that implement AutoML mechanisms only support subsets of the data science workflow, and are mainly restricted in that only hyperparameter optimization is allowed.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for optimizing performance of an automated machine learning (AutoML) operation to configure parameters of a machine learning model. The method comprises configuring AutoML logic based on an initial default value and initial range for parameter sampling of a parameter of the machine learning model. The method also comprises executing an initial AutoML process on the machine learning model based on a plurality of datasets comprising a plurality of domains of data elements, utilizing the initially configured AutoML logic. In addition, the method comprises generating, for each domain in the plurality of domains, a derived cross-dataset default value and derived cross-dataset value range derived from results of the execution of the initial AutoML process. Furthermore, the method comprises storing, for each domain in the plurality of domains, an entry of a data structure comprising the derived cross-dataset default value and cross-dataset value range for the domain. The method also comprises performing, by the AutoML logic, a subsequent AutoML process on a new dataset based on one or more entries of the data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
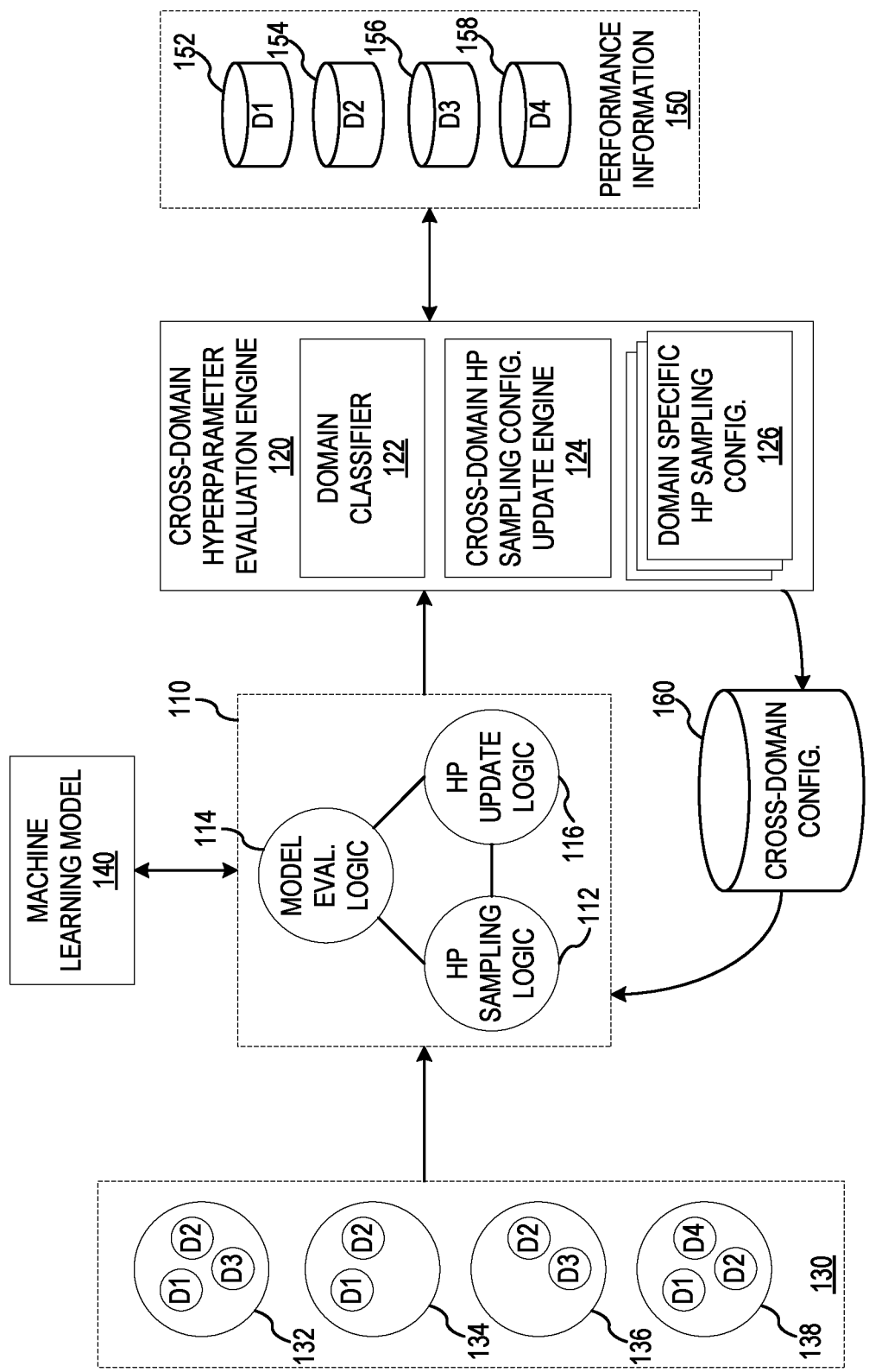
FIG. 1 is an example diagram illustrating a general overview of an augmented automated machine learning (AutoML) process in accordance with one illustrative embodiment.

In machine learning applications, practitioners have a dataset consisting of input data points to train the machine learning computer models that they plan to implement. The raw data of the dataset itself may not be in a form such that all machine learning computer models may be able to operate on the raw data "out of the box." A human subject matter expert may have to apply appropriate data preprocessing, feature engineering, feature extraction, and feature selection methods that make the dataset amenable for machine learning by the particular machine learning computer model being trained. Following those preprocessing steps, human practitioners must then perform computer model selection and hyperparameter optimization to maximize the predictive performance of their machine learning model. Clearly all of these steps introduce their own challenges, provide many sources of human error, and a significant time commitment for completion, which accumulates to a significant hurdle to organizations getting started with machine learning tools.

Automated machine learning (AutoML) provides an approach to automating the process of applying machine learning to real-world problems in an attempt to reduce the burdens noted above when introducing machine learning as a tool to improve the operations performed by various organizations. However, AutoML cannot automate every aspect of training a machine learning computer model. e.g., see Chris Nicholson, "A Beginner's Guide to Automated Machine Learning & AI," Pathmind website, 2019. To the contrary, AutoML tools currently are limited to focusing primarily on tuning machine learning model hyperparameters. For example, Eclipse Arbiter is a hyperparameter optimization library that can automate hyperparameter tuning for deep neural network training, which is traditionally a manual process of a data scientist.

While AutoML tools exist for assisting with hyperparameter tuning, it can be appreciated that the process of identifying optimized hyperparameter settings is still a time consuming and computation intensive process. That is, each hyperparameter has a set of possible values, and there are multiple hyperparameters that are set for most machine learning computer models. Given even a small set of hyperparameters for a machine learning computer model (hereafter referred to simply as a "model" or "ML model") the task of evaluating each combination of each possible hyperparameter value takes significant time and computation. For example, consider a machine learning computer model for text classification for a chatbot service, i.e. a machine learning computer model that receives input text and classifies the key terms/phrases in the input text into one of a plurality of possible subject matter classifications. Such a machine learning computer model may have, for example, six main hyperparameters: penalty term, kernel, degree, scale, tolerance, and class size. Each of these six hyperparameters may be any of a plurality of different values. For each combination of each of the six hyperparameters, in order to determine whether that particular set of values for the size hyperparameters provides an improvement in the performance of the ML model, the ML model must be configured with the selected set of hyperparameters and run on one or more training data to generate output results which can then be used to determine the performance of the ML model, e.g., accuracy of the ML model as determined from the loss function of the ML model and the ground truth of the training data. Doing this for each possible combination of hyperparameter value settings takes considerable time and computational effort. This is exacerbated when one recognizes that for the same ML model, the optimum hyperparameter value settings may be different for different domains, and modern datasets often comprise data of different domains, i.e. are mixed domain datasets.

The illustrative embodiments augment the AutoML process by providing mechanisms for improving the parameter sampling operations, such as hyperparameter sampling, in the AutoML process, i.e. determining what settings of parameters to evaluate to determine a best performance set of parameters for configuring the machine learning model. It should be appreciated that while the description of the illustrative embodiments will primarily focus on the determination of the best performance set of hyperparameters for configuring the machine learning model, as an example, the illustrative embodiments are not limited to such. Rather, the mechanisms of the illustrative embodiments may be implemented to augment the AutoML process with regard to any parameters of a machine learning (ML) model. For example, rather than, or in addition to, augmenting the AutoML process with regard to hyperparameters, the mechanisms of the illustrative embodiments may augment the AutoML process with the learning or tuning of weights implemented by the ML model with regard to various features evaluated by the ML model. Any other parameters of a ML model that may be learned through an AutoML process are also considered to be within the spirit and scope of the present invention with regard to the improvements of the AutoML parameter sampling provided by the mechanisms of the illustrative embodiments.

Assuming, for illustrative purposes, that the parameters are hyperparameters of the ML model, the mechanisms of the illustrative embodiments improve the hyperparameter sampling stage of the AutoML process and provide a framework for scaling out and optimizing an AutoML process to a large number of datasets under constrained resources. The illustrative embodiments perform automated improvement of the hyperparameter sampling in the AutoML process, based on historical performance, on a continuous or periodic basis. The illustrative embodiments utilize cross-domain information for robust estimates of AutoML sampling ranges. As a result, the mechanisms of the illustrative embodiments reduce time and computational effort in identifying the optimum hyperparameter settings for training an ML model.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the present invention is specifically directed to an improved computer tool that improves the performance of an AutoML process that optimizes the parameters, which in the examples of the present description will be considered to be hyperparameters for illustrative purposes, of a machine learning (ML) model for a dataset. The present invention augments the AutoML process by providing an automated computing tool that determines the sampling configuration for sampling sets of hyperparameters for determining an optimum set of hyperparameters for a ML model.

FIG. 1 is an example diagram illustrating a general overview of an augmented AutoML process in accordance with one illustrative embodiment. As shown in FIG. 1, the AutoML process 110, comprises multiple stages of logic 112-116 which are repeatedly executed until the hyperparameter value settings for the ML model 140 are optimized, e.g., a particular time constraint is met, a particular amount of improvement in the performance of the model, e.g., a loss or error, is equal to or less than a particular threshold, a particular amount of improvement in performance is not able to be achieved, or any other suitable stopping criteria for the AutoML process 110. Once the AutoML process 110 completes, a set of learned hyperparameter values are generated that provide an optimum performance of the ML model 140 during training of the ML model 140 and/or runtime deployment of the ML model 140. That is, this set of learned hyperparameters are learned from the AutoML process 110 and may be used to configure an instance of the ML model for training using a training dataset and/or in a runtime environment which processes new workloads using the configured model.

The augmented AutoML process of the illustrative embodiment as shown in FIG. 1 augments the AutoML process 110 by having a layer of automation, referred to as the cross-domain hyperparameter evaluation engine 120, which operates to identify the sample configuration for sampling the hyperparameters when performing the AutoML process 110, e.g., a default hyperparameter value, a lower boundary of the hyperparameter value, and an upper boundary of the hyperparameter value, across a plurality of domains. Moreover, this cross-domain hyperparameter evaluation engine 120 may automatically update the sampling configuration for sampling the hyperparameters on a continuous or periodic basis such that the sampling configuration is kept up to date as new datasets are processed by the machine learning (ML) model.

As shown in FIG. 1, the AutoML process 110 itself comprises a first stage logic 112, referred to as the hyperparameter (HP) sampling stage logic 112, for sampling of hyperparameters based on a prior understanding of the ML model. For example, an initial set of hyperparameter values for N parameters of a computer model may be set as beta=(param1, param2, . . . paramN), along with an initial upper bound and lower bound for each of these hyperparameter values. The initial values and initial upper and lower bounds for each of these hyperparameter values may be initially set by a subject matter expert (SME), for example.

The following operations are performed for each iteration of the AutoML process 110. The hyperparameter sampling stage logic 112 identifies a listing of alternative sets of hyperparameter values, e.g., beta*'s such as [beta*1, beta*2, beta*3, . . . ], which comprises each possible combination of the possible hyperparameter values. It should be noted that the values of each of the hyperparameter values must be within the lower/upper bound specified in the initial settings. The hyperparameter sampling stage logic 112 also calculates acquisition function values for each of the sets of hyperparameter values beta*1, beta*2, etc. such that for each beta*i, where i is the number of sets of hyperparameters, there is an associated acquisition function value. The acquisition function value indicates the expected performance gain in the ML model 140 performance for a change of the hyperparameter values to the values in the associated set of hyperparameter values, i.e. beta*i. The use of acquisition functions is generally known in the art and thus, a more detailed description is not provided herein.

Based on the acquisition function values associated with the various sets of hyperparameter values, a next beta*i is selected for evaluating the performance of the ML model 140. The next beta*i that is selected for evaluation may be the beta*i that has not already been evaluated and which has a highest acquisition function value, for example. In other embodiments, the next beta*i selected for evaluation may be selected using other criteria, such as using a sampling probability [p 1, p 2, p 3, . . . ] of the beta*i's where the sampling probability is calculated as a function of the acquisition function values for the different beta*i's.

Once a next beta*i is selected by the hyperparameter sampling stage logic 112, the performance of the ML model 140, configured with the hyperparameter values corresponding to the selected set of hyperparameter values (beta*i), is evaluated with regard to one or more performance metrics of interest, e.g., accuracy of the output of the ML model 140 relative to a ground truth as may be measured by a loss function, for example. That is, the acquisition function value is merely a prediction of what performance improvement is expected or what performance improvement may be obtained by modifying the hyperparameter values to the selected set of hyperparameter values (beta*i). The ML model 140's actual performance still needs to be investigated to determine if an actual improvement in the performance of the ML model 140 is realized by the modification of the hyperparameter values.

To evaluate the performance of the ML model 140, the AutoML process 110 comprises a second stage 114, referred to as the ML model 140 evaluation stage 114, having logic that configures the ML model 140 with the selected set of hyperparameter values, and executes the ML model 140 on one or more input datasets 130. The one or more input datasets 130 comprise labeled data where the labels indicate a domain of the corresponding data. The one or more input datasets 130 may comprise data in a variety of different domains, e.g., domains D1-D4, and thus, may be mixed domain datasets, where each dataset may have a different amount of data associated with different domains. The domain itself is a subject matter area, e.g., telecommunications, banking, insurance, energy, manufacturing, health, etc. It can be appreciated that a ML model may operate on data of various domains and that the hyperparameter values for configuring the ML model may cause the ML model to perform better for different domains, i.e. the ML model, given a hyperparameter value X, will perform better for data in domain D1 than for data in domain D4, for example.

In the case of training data, the labels of the data in the datasets 130 further comprise a ground truth classification or output that is a correct output of a properly trained ML model given the corresponding input data. This ground truth output may be compared to the actual output generated by the ML model 140 to evaluate a performance of the ML model 140 with regard to the correct output, e.g., a loss function may be used to calculate an error in the ML model 140 output, such as in a backpropagation based machine learning process. One or more performance metrics may be calculated based on the output of the ML model 140 and the particular training data used, such as accuracy of the output of the ML model 140 relative to the ground truth correct ML model output. The performance metric(s) may be compared to previously obtained performance metric(s) for a previous selected set of hyperparameter values to determine if the performance metric(s) has/have improved.

This evaluation of improvement may be based on a predetermined function of the change in the performance metric(s). In the case of a single performance metric evaluation, the function may be based on the difference between the current performance metric and a previous performance metric. In the case of a plurality of performance metrics being evaluated, any desirable function of the differences in performance metrics may be utilized, e.g., a weighted evaluation of the differences between the performance metrics where a different weight may be applied to different performance metrics based on a desired implementation and a relative importance of the performance metric to the optimal performance of the ML model 140. The values generated by the function of the comparison of the performance metrics may be compared to one or more threshold values to determine if a significant enough improvement in performance has been achieved.

In a third stage 116 of the AutoML process 110, hyperparameter (HP) update logic is provided for modifying the baseline set of hyperparameter values against which the performance of other sets of hyperparameter values are evaluated, in the case that a significant enough improvement in performance is achieved. That is, if a significant enough improvement has not been achieved, then the process may be repeated with the next selected set of hyperparameter value settings without modifying the baseline set of hyperparameters used for the comparison. If a significant enough improvement has been achieved then the selected set of hyperparameter values, i.e. the selected beta*i, is used to replace the previous selected set of hyperparameter values for configuring the ML model 140. This process may be repeated until a stopping criteria is achieved, e.g., a predetermined amount of execution time occurs, a predetermined level of performance of the ML model 140 is achieved, an amount of improvement in performance of the ML model 140 is not able to be achieved, or the like.

As noted previously, the evaluation of the possible sets of hyperparameter values during an AutoML process requires a large amount of computational resources and time to accomplish. The illustrative embodiments provide a cross-domain hyperparameter evaluation engine 120 that augments this AutoML process 110 by providing automated computer logic that improves the operation of the hyperparameter sampling stage logic 112 by providing configuration information specifying default (initial) values and ranges, i.e. upper and lower bounds, for hyperparameters for use in sampling hyperparameter values for inclusion in the sets of hyperparameter values, e.g., beta*1, beta*2, . . . beta*i, during the AutoML process 110. This identification of the sampling configuration information for configuring the hyperparameter sampling stage logic 112 is performed across multiple domains of input data, providing a more robust configuration of the hyperparameter sampling stage logic 112 for the particular domains of data processed by the ML model 140.

Thus, a more targeted evaluation of sets of hyperparameter values is achieved which reduces the amount of computation resources needed and computation time need to identify a set of optimal hyperparameter values for configuring the ML model 140. Moreover, this process may be performed automatically and continuously or periodically so as to maintain the hyperparameter value selection for a ML model 140 to be the optimum set of hyperparameter values for the particular domain(s) of the dataset(s) being processed by the ML model 140 as new datasets are received by the ML model 140.

As shown in FIG. 1, the primary operational components of a cross-domain hyperparameter evaluation engine 120 of the illustrative embodiments include a domain classifier 122 and a cross-domain hyperparameter sampling configuration update engine 124. The domain classifier 122 is a machine learning model, such as a neural network, deep neural network, convolutional neural network, or other machine learning model, that is trained on one or more input datasets, e.g., one or more datasets 132-138 having labeled domains, to recognize patterns of content indicative of particular domains and thereby classify data elements of the input datasets into a plurality of predefined domains, e.g., domains D1-D4, where an input dataset 132 may comprise data elements of various domains D1-D4 such that it represents a mixed domain dataset, e.g., mixed domain dataset 132 in the set of input datasets 130. From the domain classification, a relative amount of the domain representation within the mixed domain dataset 132 may be calculated, e.g., an input dataset 132, referred to as "workspace 1", may be comprised of data elements of which 80% of the data elements are classified in domain 1 (D1), 10% of the data elements are classified in domain 2 (D2), and 10% of the data elements are classified in domain 3 (D4), with 0% of the data elements being classified in domain 4 (D4). The relative amount of the domains represented in the dataset 132 may be used as a weighting factor for evaluating values associated with hyperparameters of the ML model 140 for which AutoML process 110 is being performed and for which the augmented hyperparameter set selection performed by the cross-domain hyperparameter evaluation engine 120 is being performed.

Thus, with the mechanisms of the illustrative embodiments, one or more domain labeled datasets 130 are provided to train a domain classifier 122 of the cross-domain hyperparameter evaluation engine 120 to identify patterns of characteristics of data elements of input datasets 132-138 so as to classify the data elements with regard to the particular domain D1-D4 with which they are associated. For example, in an implementation of the illustrative embodiments operation on textual content, the domain classifier 122 is trained to classify the textual content of the input datasets 132-138 as to subject matter domain D1-D4, e.g., text directed to sports, text directed to financial industry, text directed to medical concepts, text directed to other domains. The granularity of the domains may be implementation specific. The training of the domain classifier 122 in this example implementation may utilize natural language processing (NLP) by an NLP engine (not shown) to extract features of the textual input, e.g., key terms, phrases, structures, metadata, and any other semantic and/or syntactic features, which generates a pattern of features that are input to the domain classifier 122. The domain classifier 122 then generates a predicted classification of a domain D1-D4 of the input pattern of features which is then compared to the actual domain classification specified in the labeled dataset 132-138 so as to determine a loss which is then used in a backpropagation operation to modify the operational parameters of the domain classifier 122 so as to reduce the loss until a predetermined threshold level of loss is achieved. Such an operation is generally known in the machine learning technology for training a machine learning computer model, such as a neural network or the like.

The performance metrics generated through the AutoML process 110 described previously may be performed with regard to the entire labeled dataset, e.g., dataset 132, and stored as domain performance metrics 150 in data structures 152-158 for the various domains identified by the domain classifier 122 for the corresponding data elements in the dataset 132. For example, an initial setting of the configuration parameters, e.g., the default (initial) value and the upper and lower bounds for the hyperparameters of interest may be provided, such as by a SME or the like, for configuring the hyperparameter sampling stage logic 112 of the AutoML process 110. An initial AutoML process 110 may be performed using this initial setting of the configuration information for the hyperparameter sampling stage logic 112 in order to generate performance metric information that is categorized into different domains by the domain classifier 122 to thereby store the domain performance metrics 150 in data structures 152-158. Moreover, the domain classifier 122 may identify the relative proportions of the different domain representations in the data elements of the various datasets 132-138, e.g., 70% domain X, 20% domain Y, and 10% domain Z. From the performance metrics 150, an optimum value, i.e. a "learned" value, for a hyperparameter that provides an optimum performance of the ML model 140 may be identified for each domain of each dataset 132-138, such as by identifying performance improvements in the manner previous described above.

The cross-domain hyperparameter sampling configuration update engine 124 may identify updated sampling configuration information for each individual domain by performing a weighted cross-dataset evaluation to calculate an updated default (initial) value for hyperparameter sampling. For example, for a domain D1, the learned values for a specific hyperparameter, e.g., hyperparameter 1 (param1), across each dataset for domain D1 may be evaluated using a weighted evaluation where the weights are proportional to the relative representation of that domain D1 in the dataset. For example, if a first dataset (workspace1) has 90% of its data elements classified into domain D1, and has a learned value for the hyperparameter (param1) of 0.3, and a second dataset (workspace2) has 10% of its data elements classified into domain D1 and a learned value for the hyperparameter (param1) of 0.5, then an updated default value for the hyperparameter (param1) may be set to a weighted function of these values where the weights are based on the relative representation of domain D1 in each of the datasets, e.g., a first weight of 0.9 (90%) and a second weight of 0.1 (10%), such that in this example, the updated default value is a function of the values (0.9*0.3) and (0.1*0.5).

The cross-domain hyperparameter sampling configuration update engine 124 may then determine updated lower and upper bounds of the sampling configuration data based on the updated default value. For example, in one illustrative embodiment, the updated default value is determined as the weighted average of the learned values for the domain across the datasets, e.g., a L1 norm arithmetic weighted mean. It should be appreciated that any other L norm mean is possible, geometric mean, harmonic mean, or the like. In one illustrative embodiment, the lower and upper bounds may be determined as a function of the default value and a statistical measure, such as a standard deviation or the like. In one illustrative embodiment, the lower bound is calculated as the difference of the updated default value and one standard deviation, while the upper bound is calculated as the sum of the updated default value and one standard deviation. Of course, other functions for determining the updated default value and updated lower and upper bounds may be used without departing from the spirit and scope of the present invention. For example, for the upper/lower bounds, an x % quantile may also be used without departing from the spirit and scope of the present invention.

The updated hyperparameter sampling configuration parameters for each domain may be stored in a domain specific hyperparameter sampling configuration data structure 126 which has entries, each entry associating a domain with a corresponding default value and corresponding lower and upper bounds for hyperparameter sampling as identified by the cross-dataset analysis. Thus, for example, there may be a separate entry for each domain D1-D4, with each entry having the cross-dataset analysis generated updated default value and updated lower/upper bounds for that particular domain. In one illustrative embodiment, the domain specific hyperparameter sampling configuration data structure 126 may be provided as a table data structure having rows corresponding to domains and separate columns for default value, lower bound, and upper bound. There may be a separate domain specific hyperparameter sampling configuration data structures 126 for each hyperparameter of interest.

The cross-domain hyperparameter sampling configuration update engine 124 may operate on these hyperparameter learned values to perform a cross-domain analysis of the hyperparameter learned values to derive updated hyperparameter sampling configuration parameters for the hyperparameter sampling stage logic 112 of the AutoML process 110 for a given input dataset. For example, given an input dataset, which may be a single domain dataset or mixed domain dataset, the domain classifier 122 may determine which domains are represented in the input dataset and the degree of representation of each domain within the input dataset. The corresponding sampling configuration data for the domain(s) in the input dataset may be retrieved from the hyperparameter sampling configuration data structure(s) 126 for the hyperparameter(s) of interest by performing a lookup operation within the data structure(s). For example, if the input dataset is a mixed dataset comprising data elements in domains D1-D3, and a single hyperparameter (param1) is being evaluated, then the three entries in the hyperparameter sampling configuration data structure 126 for the hyperparameter (param1) corresponding to domains D1-D3 are retrieved and used by the cross-domain hyperparameter sampling configuration update engine 124 to perform a cross-domain hyperparameter sampling configuration update, and thereby generate cross-domain configuration information 160, for updating the hyperparameter sampling logic 112 configuration, e.g., the default value, lower bound, and upper bound for each hyperparameter, when performing the AutoML process 110 for the specific dataset.

Once the AutoML process 110 is completed for the input dataset, and a new learned default value is generated for each domain in the input dataset, the values in the corresponding entries of the hyperparameter sampling configuration data structure 126 for the hyperparameter are updated in the manner previously described above by resetting the default values in the entries to be the new learned default value and recalculating and updating the lower and upper bounds in the entries based on the new learned default value. It should be appreciated that this process may be repeated for each subsequent input dataset that is processed by the ML model such that the hyperparameter sampling configuration data is continuously or periodically updated which improves the subsequent AutoML process 110 by continuously refining the default values and lower/upper bounds of the range of possible hyperparameter values which are sampled for inclusion in sets of hyperparameters during the AutoML process 110. Thus, the optimization of hyperparameters and configuration of the ML model for subsequent datasets by the AutoML process 110 is improved.

Thus, the cross-domain hyperparameter evaluation engine 120 provides logic to perform a cross-dataset analysis, for each hyperparameter and for each domain, to thereby generate initial configuration parameters for hyperparameter sampling in hyperparameter sampling stage logic 112 of an AutoML process 110. The cross-domain hyperparameter evaluation engine 120 further provides logic to perform a cross-domain hyperparameter evaluation to thereby identify configuration parameters for hyperparameter sampling for a specific dataset and ML model. This cross-domain hyperparameter evaluation is specific to the particular domains represented in the input dataset.

Again, while the present description focuses on the learning/tuning of hyperparameters through the AutoML process, and the improvements to such learning/tuning provided by the mechanisms of the illustrative embodiments with regard to the learning of the configuration of parameters for hyperparameter sampling by the AutoML process, the illustrative embodiments are not limited to such and may be implemented with regard to any parameters of a ML model that may be learned through an AutoML process. For example, instead of only tuning the hyperparameters of the ML model, the mechanisms of the illustrative embodiments may also be used to assist the AutoML process in learning/tuning the weights of features evaluated by the ML model. For example, in an embodiment in which the ML model is performing text analysis, such as in the case of a chatbot, for example, an input feature vector of the ML model may be of the type: Input-feature vector=[a*unigram, b*bigram, c*embedding], where a, b, and c are weights for the features unigram, bigram, and embedding, respectively. Thus, in addition, or alternatively to, the learning/tuning of the ML model hyperparameters through the AutoML process, these additional weight values a, b, and c, may also be learnable parameters for the AutoML process and the mechanisms of the illustrative embodiments may similarly be implemented to predict a configuration of sampling parameters for the AutoML process to initialize its sampling for these particular parameters. Thus, the illustrative embodiments are not limited to hyperparameters and may be implemented with regard to any ML model parameters that are learnable through an AutoML process.

Figure 2:
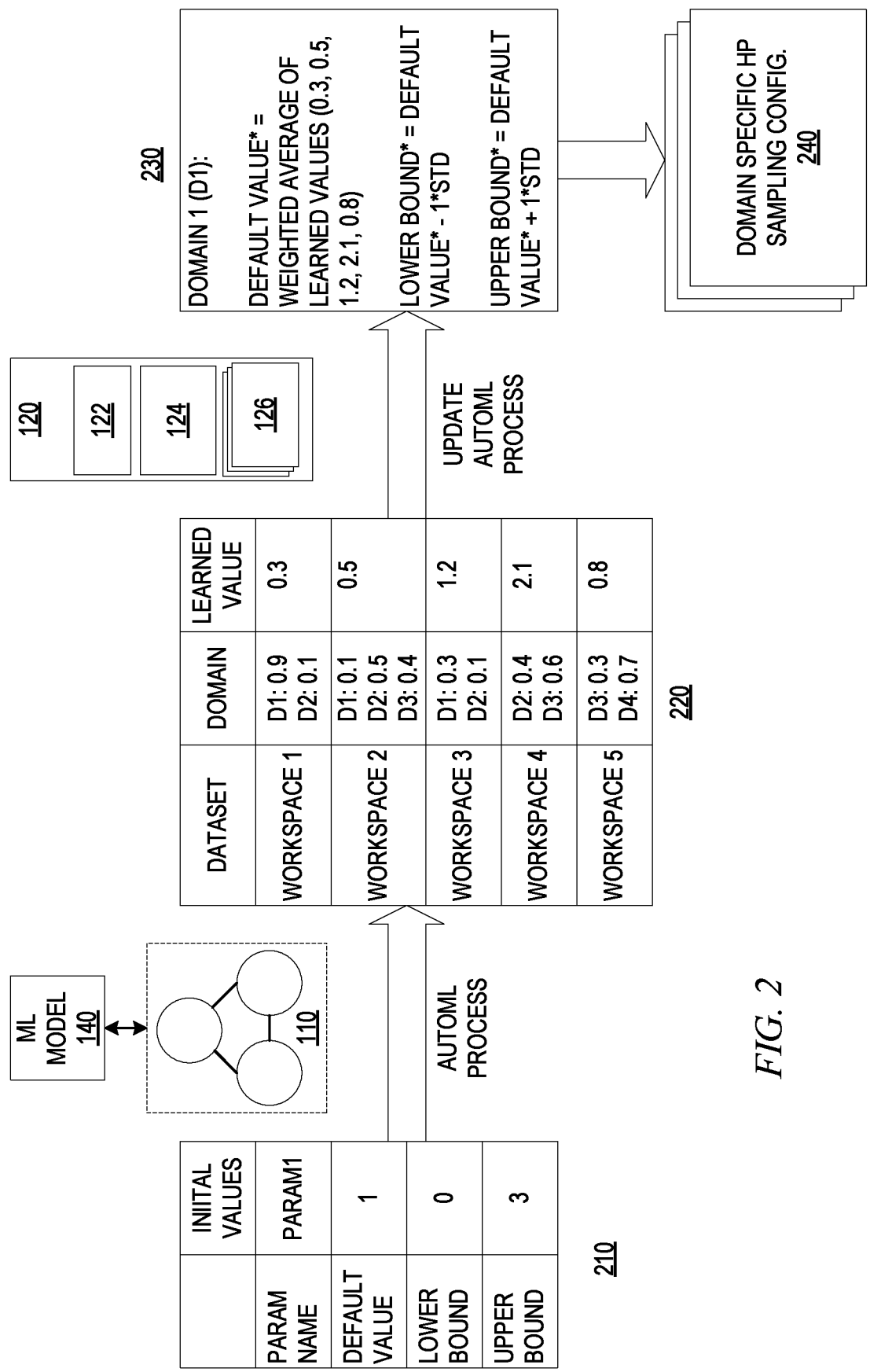
FIG. 2 is an example diagram illustrating an example operation of the mechanisms of a cross-domain hyperparameter evaluation engine when performing a cross-dataset analysis in accordance with one illustrative embodiment.

FIG. 2 is an example diagram illustrating an example operation of the mechanisms of a cross-domain hyperparameter evaluation engine when performing a cross-dataset analysis in accordance with one illustrative embodiment. To simply the explanation for ease of understanding, the description of the illustrative embodiment with regard to FIGS. 2-5 will assume that a single hyperparameter (param1) is being evaluated using the augmented AutoML process of the illustrative embodiments. However, it should be appreciated that this augmented AutoML process may also be performed for a plurality of hyperparameters of interest and may be used to identify, for each hyperparameter of interest, the default value and sampling range, i.e. lower/upper bounds, for performing the hyperparameter sampling as part of the AutoML process.

Figure 3:
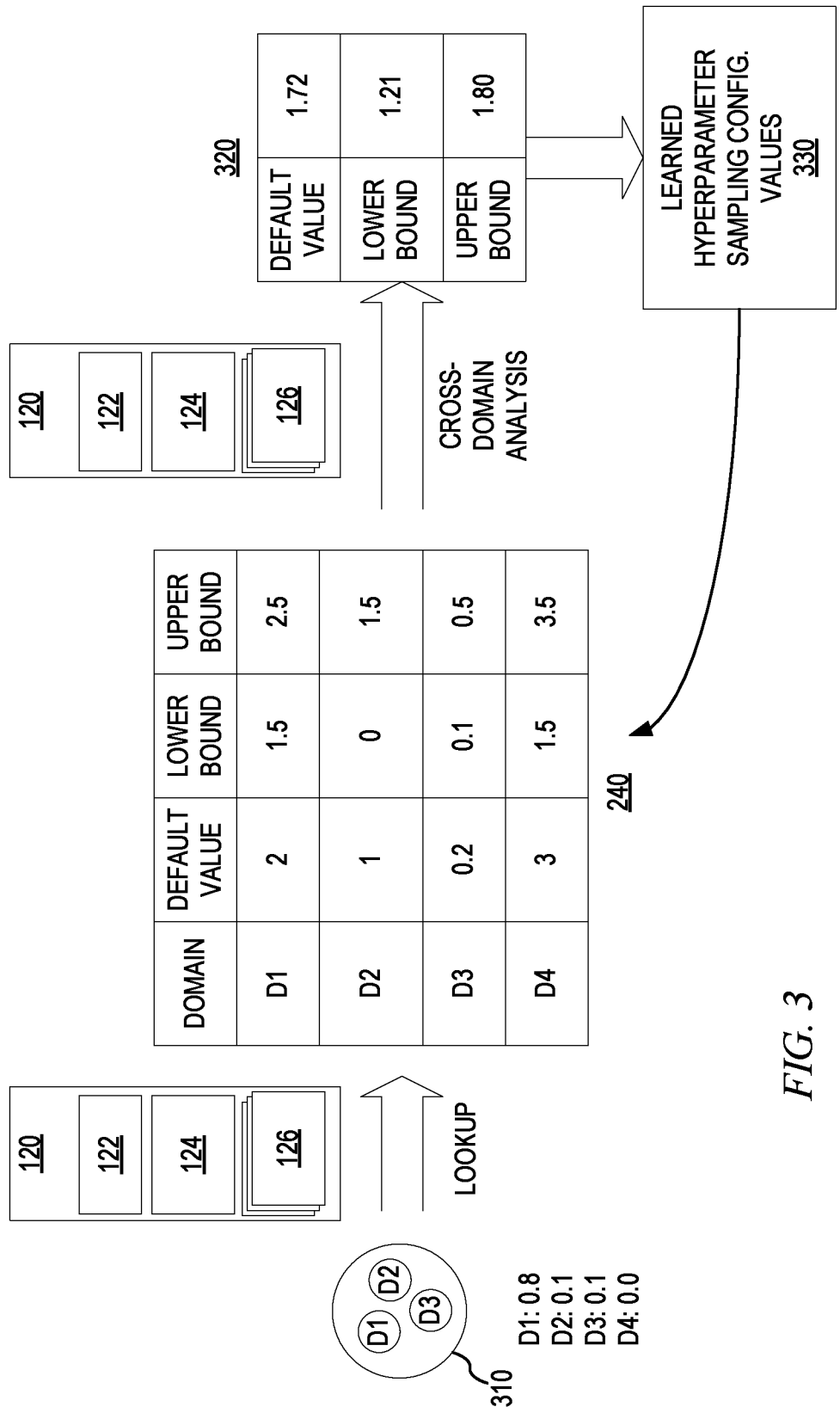
FIG. 3 is an example diagram illustrating an example operation of the mechanisms of a cross-domain hyperparameter evaluation engine when performing a cross-domain analysis for an input dataset in accordance with one illustrative embodiment.
Figure 4:
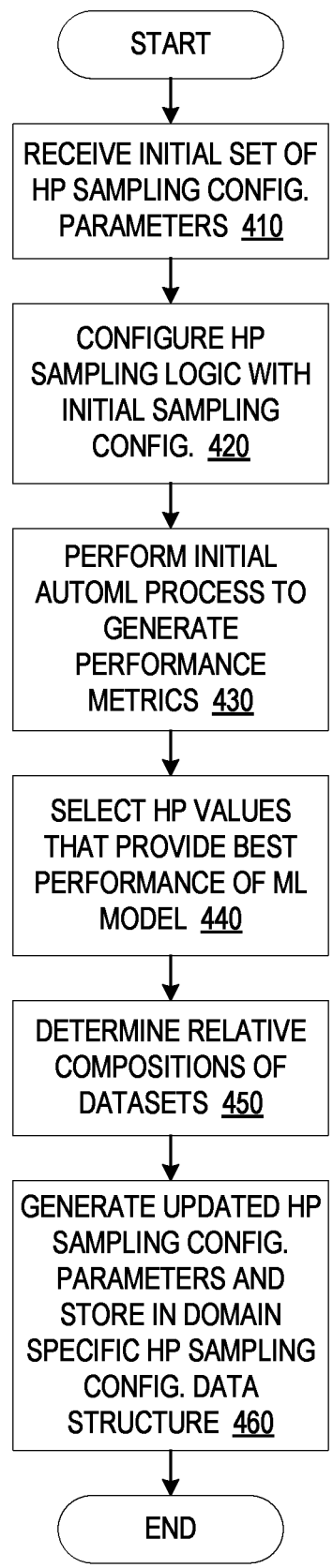
FIG. 4 is a flowchart outlining an example operation of a cross-domain hyperparameter evaluation engine when performing a cross-dataset analysis in accordance with one illustrative embodiment.

As shown in FIG. 2, an initial set of hyperparameter sampling configuration parameters 210 is provided, where this initial set of configuration parameters 210 is applicable to all domains. This initial set of hyperparameter sampling configuration parameters 210 may be provided, for example, by a human subject matter expert (SME) based on the SME's own knowledge. This initial set of hyperparameter sampling configuration parameters 210 are used to perform an initial AutoML process, such as described previously with regard to FIG. 1, and thereby generate for performance metrics for each sampled set of hyperparameter values which are then used to identify a particular setting of hyperparameter values that provide a best, or optimum, performance of the ML model when the ML model is configured with the selected set of hyperparameter values. As shown in FIGS. 2-4, the value of hyperparameter param1 that provides the best performance of the ML model based on the evaluation of the performance metrics generated by this initial AutoML operation is the "learned" value for the hyperparameter. There may be a separate "learned" value for the hyperparameter for each domain that is represented in the data used to evaluate the ML model. In one illustrative embodiment, the "learned" value is the value of the hyperparameter param1 that provides the best accuracy in the output generated by the ML model given the input dataset(s).

For example, as shown in FIG. 2, there may be different datasets, referred to as workspaces, i.e. workspace1-workspace 5. Each dataset may have different compositions of data elements classified into different domains such that each dataset may have different representations of the domains within the dataset. The compositions of these datasets may be specified in the case of labeled training data, may be determined by a trained domain classifier of the illustrative embodiment, as discussed above, in the case of an unlabeled dataset. Thus, in the depicted example, workspace1 is composed data elements where 90% of the data elements are classified in domain D1 and 10% of the data elements are classified in domain D2. Workspace2 in the depicted example is composed of data elements in which 10% of the data elements are classified in domain D1, 50% of the data elements are classified in domain D2, and 40% of the data elements are classified in domain D3. Similar relative representations of different domains are shown in FIG. 2 for the other datasets.

As shown in FIG. 2, for each of these datasets, a learned value for the hyperparameter param1 is determined through the AutoML process, e.g., AutoML process 110 in FIG. 1. Thus, for example, for the first dataset the learned value is 0.3, for the second dataset the learned value is 0.5, and so on. Thus, different learned values are generated for different domains. This information regarding the composition of the datasets and the learned values may be stored in an optimized hyperparameter data structure 220.

This information 220 obtained from the AutoML process is provided to the cross-domain hyperparameter evaluation engine 120. The cross-domain hyperparameter evaluation engine 120 evaluates the learned values for each domain and generates updated configuration data 230 for the hyperparameter sampling performed as part of the AutoML process, i.e. an updated default value and updated lower/upper bound for the hyperparameter sampling is generated. For example, the cross-domain hyperparameter evaluation engine 120 may, for each domain, determine an updated default value using the weighted average of the learned values across the datasets. Thus, in the depicted example, the default value for hyperparameter param1, and domain D1, may be calculated as the weighted average (or mean) of the learned values for domain D1 across each of the datasets as follows: default value*=(0.9*0.3)+(0.1*0.5)+(0.3*1.2)+(0.4*2.1)+(0.3*0.8) =1.76.

Based on the updated default value, the lower and upper bounds may be determined as the difference and sum, respectively, of the updated default value and a weighted standard deviation. In the depicted example, the weighted standard deviation is calculated using the known formulation for a weighted standard deviation as follows: sqrt((0.9* (0.3−1.76)^2+0.1*(0.5−1.76)^2+0.3*(1.2−1.76)^2+0.4* (2.1−1.76)^2+0.3*(0.8−1.76)^2)/(4/5*(0.9+0.1+0.3+0.4+ 0.3))=1.415715, or rounded to 1.42. Thus, in the depicted example, the hyperparameter sampling configuration parameters for hyperparameter param1 and domain D1 across the datasets workspace1-workspace5 are as follows: default value=1.76, lower bound=0.34, and upper bound=3.18. These values may then be stored in an entry of a domain specific hyperparameter sampling configuration data structure 240 for the hyperparameter. This process may be performed for each domain across the datasets to thereby populate entries in the domain specific hyperparameter sampling configuration data structure 240, which is then used by the cross-domain hyperparameter evaluation engine 120 to configure the AutoML process for new datasets that may be of a mixed domain nature based on a cross-domain analysis of the new dataset and the hyperparameter sampling configuration data for the domains represented in the new dataset.

FIG. 3 is an example diagram illustrating an example operation of the mechanisms of a cross-domain hyperparameter evaluation engine when performing a cross-domain analysis for an input dataset in accordance with one illustrative embodiment. As shown in FIG. 3, a new dataset 310 is received for use in an AutoML process to learn the optimum set of hyperparameter values for best performance of a ML model. The new dataset 310 may be a mixed domain dataset comprising data elements associated with different domains D1-D3 and each domain being represented by a different amount of data elements within the new dataset 310, i.e. each domain having a different amount of representation in the dataset 310. In the depicted example, the dataset 310 is comprised of 80% data elements classified in domain D1, 10% classified in domain D2, 10% classified in domain D3, and 0% classified in domain D4.

The domain classifier of the cross-domain hyperparameter evaluation engine 120 receives the new dataset 310 and operates on the new dataset 310 to classify data elements of the new dataset 310 into the recognized classes of domains, e.g., D1-D4, and thereby identify the relative representation of each domain in the dataset 310. Based on the determined domains present in the dataset 310, the cross-domain hyperparameter evaluation engine 120 performs a lookup operation on the domain specific hyperparameter sampling configuration data structure 240 for the hyperparameter of interest (param1), to retrieve the hyperparameter configuration parameters for the domains present in the dataset 310, e.g., domains D1-D3 in the depicted example.

The cross-domain hyperparameter evaluation engine 120 then performs a cross-domain analysis of the retrieved hyperparameter sampling configuration parameters for the domains present in the dataset 310. This cross-domain analysis may comprise performing a similar determination of default value, lower bound, and upper bound for the hyperparameter values as discussed above with regard to FIGS. 1 and 2, but with the weighted average being calculated across domains rather than datasets. For example, in the depicted example, the weighted average of the default values for domains D1-D3 may be calculated as default value*=(2*0.8)+(1*0.1)+(0.2*0.1)=1.72. The lower bound and upper bounds may be calculated using a similar weight average of the lower and upper bounds, respectively, of the various domains D1-D3. Of course, as mentioned previously, other statistical functions of the default values, upper bound, and lower bound may be used to generate these cross-domain configuration parameters 320 without departing from the spirit and scope of the present invention.

The cross-domain configuration parameters 320 determined by the cross-domain hyperparameter evaluation engine 120 based on the identified domains represented in the input dataset 310 are then used to configure the hyperparameter sampling logic of the AutoML process for hyperparameter param1. The AutoML process 110 is then performed on the new dataset 310 to generate new learned values for the hyperparameter based on the sampling of hyperparameter values using the default value and lower/ upper bounds specified in the cross-domain configuration parameters 320 and the evaluation of the ML model's performance as described previously. These learned values 330, similar to the process described with regard to FIG. 1, may include learned values for each of the domains D1-D3 represented in the input dataset 310. These learned values 330 may then be used by the cross-domain hyperparameter evaluation engine 120 to update the corresponding entries in the domain specific hyperparameter sampling configuration data structure 240. This process may be repeated for each subsequent new dataset 310 received such that the learning of the hyperparameter sampling configuration parameters is continuously or periodically updated.

FIG. 4 is a flowchart outlining an example operation of a cross-domain hyperparameter evaluation engine when performing a cross-dataset analysis in accordance with one illustrative embodiment. As shown in FIG. 4, the operation starts by receiving an initial set of hyperparameter sampling configuration parameters (step 410). Hyperparameter sampling logic of an AutoML process is configured using the initial set of hyperparameter sampling configuration parameters to thereby generate sets of hyperparameter values for evaluation using the ML model (step 420). An initial AutoML process is performed using a plurality of training datasets to generate performance metrics of the ML model for the sets of hyperparameter values for each of a plurality of predetermined domains (step 430). A selection of a set of hyperparameter values that provides a best performance of the ML model, for each domain, as determined by the performance metrics, is performed (step 440). The relative compositions of the datasets with regard to data elements classifiable in the predetermined domains are determined (step 450). The relative compositions and learned values of the hyperparameters are evaluated to generate updated hyperparameter sampling configuration parameters (step 460) which are then stored in entries of a domain specific hyperparameter sampling configuration data structure. The operation then terminates.

Figure 5:
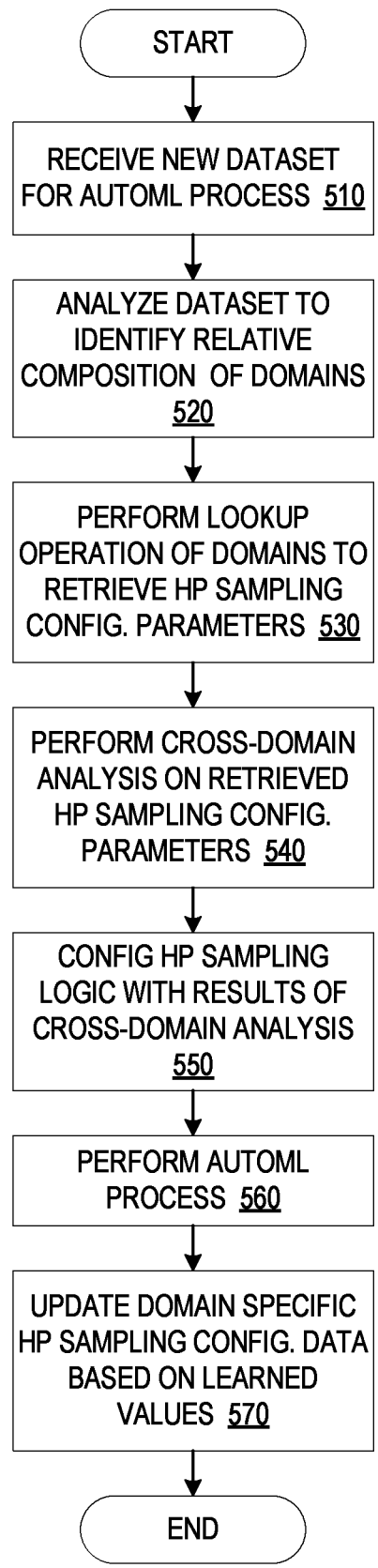
FIG. 5 is a flowchart outlining an example operation of a cross-domain hyperparameter evaluation engine when performing a cross-domain analysis for an input dataset in accordance with one illustrative embodiment.

FIG. 5 is a flowchart outlining an example operation of a cross-domain hyperparameter evaluation engine when performing a cross-domain analysis for an input dataset in accordance with one illustrative embodiment. As shown in FIG. 5, the operation starts by receiving a new dataset for use in an AutoML process to learn the optimum hyperparameter settings for a ML model (step 510). The new dataset is analyzed to identify the relative composition of domains within the dataset (step 520). A lookup operation is performed in the domain specific hyperparameter sampling configuration data structure to retrieve the hyperparameter sampling configuration parameters for the domains represented in the dataset (step 530). A cross-domain analysis is performed on the retrieved hyperparameter sampling configuration parameters to thereby generate cross-domain hyperparameter sampling configuration parameters for the particular domains of the dataset (step 540). The hyperparameter sampling logic of the AutoML process is configured with the cross-domain hyperparameter sampling configuration parameters (step 550) and the AutoML process is performed on the received dataset (step 560). The learned values obtained by the AutoML process for each domain are then used to update the entries in the domain specific hyperparameter sampling configuration data structure (step 570). The operation then terminates.

It should be appreciated that after the learned values are obtained by the AutoML process and the domain specific hyperparameter sampling configuration data structure is updated, the ML model may be trained using these learned optimal hyperparameter values. The trained ML model may then be deployed to a runtime environment and utilized by customers. For example, in one illustrative embodiment, the ML model may be a ML model employed by a chatbot service and may be used to analyze textual input from a user to classify the text and determine an appropriate response. Of course, the ML model may perform any suitable operation and is not limited to text analysis of implementation with a chatbot service.

From the above description, it is apparent that the present invention is specifically concerned with addressing the problems of automated machine learning to identify optimum hyperparameter values for the configuration of machine learning models. This is a problem that arises specifically from machine learning computer technology. The solution provided by the present invention is a specific computing tool that provides a specific technological solution for improving the way in which automated machine learning is performed with regard to machine learning models.

Figure 6:
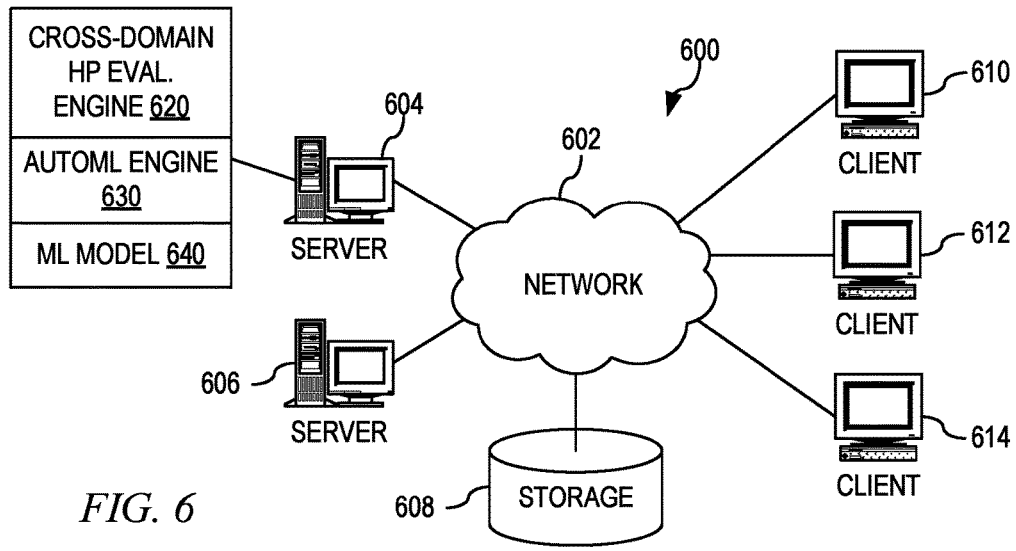
FIG. 6 is an example diagram of a distributed data processing system in which aspects of the illustrative embodiments may be implemented.
Figure 7:
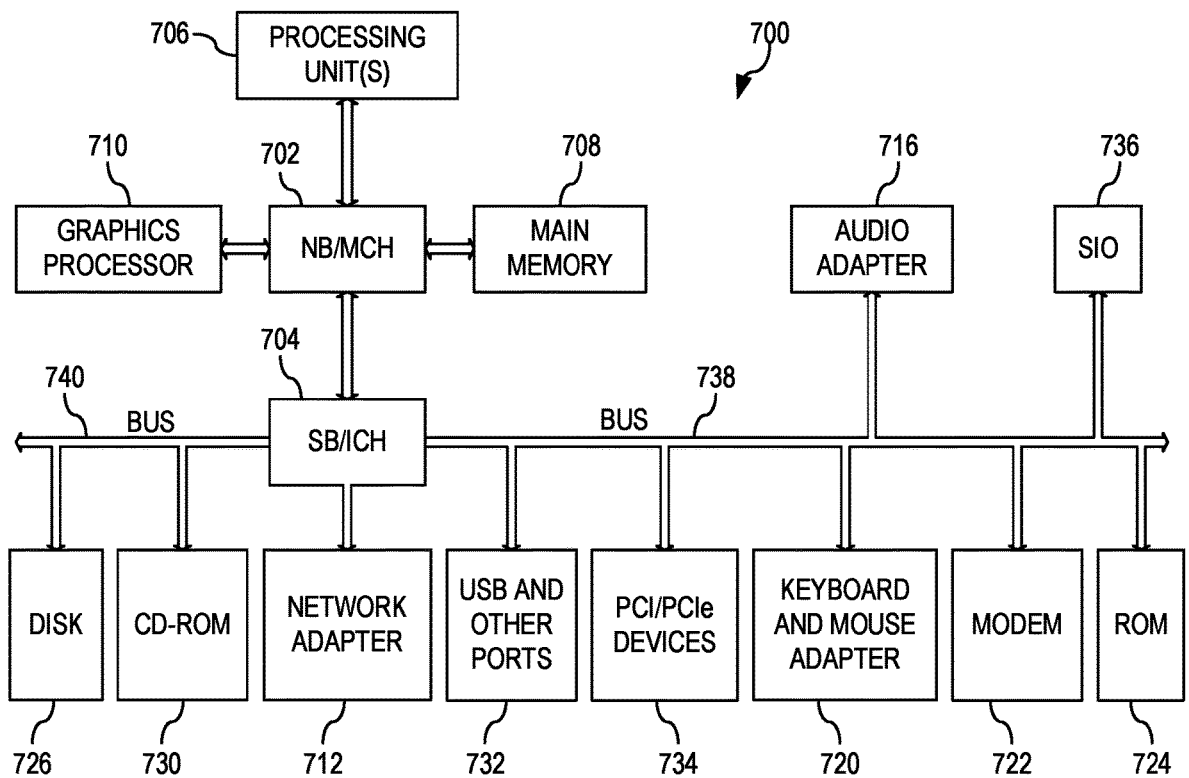
FIG. 7 is an example block diagram of a computing device in which aspects of the illustrative embodiments may be implemented.

In view of the above, it can be appreciated that the illustrative embodiments may be utilized in many different types of data processing environments. In order to provide a context for the description of the specific elements and functionality of the illustrative embodiments, FIGS. 6 and 7 are provided hereafter as example environments in which aspects of the illustrative embodiments may be implemented. It should be appreciated that FIGS. 6 and 7 are only examples and are not intended to assert or imply any limitation with regard to the environments in which aspects or embodiments of the present invention may be implemented. Many modifications to the depicted environments may be made without departing from the spirit and scope of the present invention.

FIG. 6 depicts a pictorial representation of an example distributed data processing system in which aspects of the illustrative embodiments may be implemented. Distributed data processing system 600 may include a network of computers in which aspects of the illustrative embodiments may be implemented. The distributed data processing system 600 contains at least one network 602, which is the medium used to provide communication links between various devices and computers connected together within distributed data processing system 600. The network 602 may include connections, such as wire, wireless communication links, or fiber optic cables.

In the depicted example, server 604 and server 606 are connected to network 602 along with storage unit 608. In addition, clients 610, 612, and 614 are also connected to network 602. These clients 610, 612, and 614 may be, for example, personal computers, network computers, or the like. In the depicted example, server 604 provides data, such as boot files, operating system images, and applications to the clients 610, 612, and 614. Clients 610, 612, and 614 are clients to server 604 in the depicted example. Distributed data processing system 600 may include additional servers, clients, and other devices not shown.

In the depicted example, distributed data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 600 may also be implemented to include a number of different types of networks, such as for example, an intranet, a local area network (LAN), a wide area network (WAN), or the like. As stated above, FIG. 6 is intended as an example, not as an architectural limitation for different embodiments of the present invention, and therefore, the particular elements shown in FIG. 6 should not be considered limiting with regard to the environments in which the illustrative embodiments of the present invention may be implemented.

As shown in FIG. 6, one or more of the computing devices, e.g., server 604, may be specifically configured to implement a cross-domain hyperparameter evaluation engine 620, AutoML engine 630, and ML model 640. The cross-domain hyperparameter evaluation engine 620 is specifically configured to perform the operations described above with regard to one or more of the illustrative embodiments and to operate in conjunction with the AutoML engine 630 that performs operations described above with regard to the AutoML process, such as AutoML process 110, using the ML model 640. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 604, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the improved hyperparameter sampling during an AutoML process using the cross-dataset and cross-domain hyperparameter evaluations to generate hyperparameter sampling configuration parameters as described previously.

For example, in one illustrative embodiment, datasets for processing by a ML model 640 may be provided by one or more dataset sources, such as a client computing device 610, server computing device 606, network storage system, or the like. During a training operation, these datasets may be labeled datasets that are used to train a domain classifier of the cross-domain hyperparameter evaluation engine 620 and/or to generate an initial set of performance metrics, with regard to an initial set of hyperparameter sampling configuration parameters applicable to all domains, using an AutoML process of the AutoML engine 630 that generates updated hyperparameter sampling configuration parameters for each of the domains. Thereafter, the dataset may be an unlabeled dataset that is processed by the domain classifier to identify the domains represented in the dataset, retrieve the stored hyperparameter sampling configuration parameters for the domains in the unlabeled dataset, and perform a cross-domain analysis by the cross-domain hyperparameter evaluation engine 620 to update the hyperparameter sampling configuration parameters for configuring the ML model and updating the configuration parameters for the domains present in the unlabeled dataset.

As noted above, the mechanisms of the illustrative embodiments utilize specifically configured computing devices, or data processing systems, to perform the operations for augmenting and improving the hyperparameter sampling performed by an AutoML process. These computing devices, or data processing systems, may comprise various hardware elements which are specifically configured, either through hardware configuration, software configuration, or a combination of hardware and software configuration, to implement one or more of the systems/subsystems described herein. FIG. 7 is a block diagram of just one example data processing system in which aspects of the illustrative embodiments may be implemented. Data processing system 700 is an example of a computer, such as server 604 in FIG. 6, in which computer usable code or instructions implementing the processes and aspects of the illustrative embodiments of the present invention may be located and/or executed so as to achieve the operation, output, and external effects of the illustrative embodiments as described herein.

In the depicted example, data processing system 700 employs a hub architecture including north bridge and memory controller hub (NB/MCH) 702 and south bridge and input/output (I/O) controller hub (SB/ICH) 704. Processing unit 706, main memory 708, and graphics processor 710 are connected to NB/MCH 702. Graphics processor 710 may be connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 may be connected to SB/ICH 704.

An operating system runs on processing unit 706. The operating system coordinates and provides control of various components within the data processing system 700 in FIG. 7. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 700.

As a server, data processing system 700 may be, for example, an IBM eServer™ System p° computer system, Power™ processor based computer system, or the like, running the Advanced Interactive Executive (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and may be loaded into main memory 708 for execution by processing unit 706. The processes for illustrative embodiments of the present invention may be performed by processing unit 706 using computer usable program code, which may be located in a memory such as, for example, main memory 708, ROM 724, or in one or more peripheral devices 726 and 730, for example.

A bus system, such as bus 738 or bus 740 as shown in FIG. 7, may be comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, may include one or more devices used to transmit and receive data. A memory may be, for example, main memory 708, ROM 724, or a cache such as found in NB/MCH 702 in FIG. 7.

As mentioned above, in some illustrative embodiments the mechanisms of the illustrative embodiments may be implemented as application specific hardware, firmware, or the like, application software stored in a storage device, such as HDD 726 and loaded into memory, such as main memory 708, for executed by one or more hardware processors, such as processing unit 706, or the like. As such, the computing device shown in FIG. 7 becomes specifically configured to implement the mechanisms of the illustrative embodiments and specifically configured to perform the operations and generate the outputs described herein with regard to the one or more of the cross-domain hyperparameter evaluation engine, the AutoML engine, and the ML model. It should be appreciated that different computing devices may be used to implement different ones of the cross-domain hyperparameter evaluation engine, the AutoML engine, and the ML model, and may be configured to operate in conjunction with one another to facilitate the operations previously described above with regard to one or more of the illustrative embodiments described with reference to FIGS. 1-5.

Those of ordinary skill in the art will appreciate that the hardware in FIGS. 6 and 7 may vary depending on the implementation. Other internal hardware or peripheral devices, such as flash memory, equivalent non-volatile memory, or optical disk drives and the like, may be used in addition to or in place of the hardware depicted in FIGS. 6 and 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

Thus, the illustrative embodiments provide mechanisms for improving the hyperparameter sampling operations in the AutoML process, i.e. determining what sets of hyperparameters to evaluate to determine a best performance set of hyperparameters for configuring the machine learning model. The mechanisms of the illustrative embodiments improve the hyperparameter sampling stage of the AutoML process and provide a framework for scaling out and optimizing an AutoML process to a large number of datasets under constrained resources. The illustrative embodiments perform automated improvement of the hyperparameter sampling in the AutoML process, based on historical performance, on a continuous or periodic basis. The illustrative embodiments utilize cross-domain information for robust estimates of AutoML sampling ranges. As a result, the mechanisms of the illustrative embodiments reduce time and computational effort in identifying the optimum hyperparameter settings for training an ML model.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method for optimizing performance of an automated machine learning (AutoML) operation to configure parameters of a machine learning model, the method comprising:
configuring AutoML logic based on an initial default value and initial range for parameter sampling of a parameter of the machine learning model;

executing an initial AutoML process on the machine learning model based on a plurality of datasets comprising a plurality of domains of data elements, utilizing the initially configured AutoML logic;

generating, for each domain in the plurality of domains, a derived cross-dataset default value and derived cross-dataset value range derived from results of the execution of the initial AutoML process;

storing, for each domain in the plurality of domains, an entry of a data structure comprising the derived cross-dataset default value and cross-dataset value range for the domain; and performing, by the AutoML logic, a subsequent AutoML process on a new dataset based on one or more entries of the data structure.

2. The method of claim 1, further comprising:

receiving a plurality of labeled training datasets, wherein, for each labeled training dataset, labels of the training dataset indicate, for associated portions of data in the labeled training dataset, a corresponding domain; and performing machine learning training of a domain classifier machine learning model based on the labeled training datasets to generate a trained domain classifier, wherein the trained domain classifier performs the domain classification operation on data elements of the new dataset.

3. The method of claim 2, wherein one or more of the labeled training datasets comprises a mixed domain labeled training dataset having at least two portions of data associated with at least two different domains.

4. The method of claim 1, wherein performing the subsequent AutoML process on the new dataset comprises:

performing a domain classification operation on data elements of the new dataset to identify which domains in the plurality of domains are represented in the new dataset;

retrieving, from the data structure, entries corresponding to the domains represented in the new dataset; and configuring the AutoML logic based on the retrieved entries corresponding to the domains represented in the new dataset.

5. The method of claim 1, wherein configuring the AutoML logic based on the retrieved entries corresponding on the domains represented in the new dataset comprises:

determining a cross-domain default value for the parameter based on a first statistical function of the cross-dataset default values for the domains represented in the new dataset;

determining a cross-domain value range for the parameter based on a second statistical function of the cross-dataset value ranges for the domains represented in the new dataset; and configuring parameter sampling logic of the AutoML logic with the cross-domain default value and cross-domain value range.

6. The method of claim 5, wherein the first statistical function is a weighted mean of the cross-dataset default values for the domains represented in the new dataset, wherein the weights in the first statistical function are determined based on a relative representation of the domain in the new dataset, wherein the second statistical function is a weighted mean of the cross-dataset value ranges, wherein the weights in the second statistical function are determined based on a relative representation of the domain in the new dataset.

7. The method of claim 4, wherein configuring the AutoML logic based on the retrieved entries comprises:

performing a cross-domain analysis of the derived cross-dataset default value and derived cross-dataset value range for the domains represented in the new dataset, to generate updated parameter sampling configuration data; and updating a configuration of the AutoML logic to utilize the updated parameter sampling configuration data to perform the subsequent AutoML process.

8. The method of claim 1, wherein generating the derived cross-dataset default value and derived cross-dataset value range comprises, for each domain in the plurality of domains:

determining the derived cross-dataset default value as a first statistical function of a plurality of learned values for the parameter, for the domain, generated by the AutoML logic during the initial AutoML process; and determining the derived cross-dataset value range comprises determining a lower bound as a second statistical function of the derived cross-dataset default value, and determining an upper bound as a third statistical function of the derived cross-dataset default value.

9. The method of claim 8, wherein the first statistical function is a weighted mean of the plurality of learned values, wherein the weights in the weighted mean are determined based on a relative representation of the domain in a corresponding dataset, wherein the second statistical function is a difference of the derived cross-dataset default value and one or more standard deviations of the plurality of learned values, and wherein the third statistical function is a sum of the derived cross-dataset default value and one or more standard deviations of the plurality of learned values.

10. The method of claim 1, wherein the parameter is a hyperparameter of the machine learning model.

11. A computer program product comprising a computer readable storage medium having a computer readable program stored therein, wherein the computer readable program, when executed on a computing device, causes the computing device to:

configure automated machine learning (AutoML) logic of the computing device based on an initial default value and initial range for parameter sampling of a parameter of a machine learning model;

execute an initial AutoML process on the machine learning model based on a plurality of datasets comprising a plurality of domains of data elements, utilizing the initially configured AutoML logic;

generate, for each domain in the plurality of domains, a derived cross-dataset default value and derived cross-dataset value range derived from results of the execution of the initial AutoML process;

store, for each domain in the plurality of domains, an entry of a data structure comprising the derived cross-dataset default value and cross-dataset value range for the domain; and perform, by the AutoML logic, a subsequent AutoML process on a new dataset based on one or more entries of the data structure.

12. The computer program product of claim 11, wherein the computer readable program further causes the computing device to:

receive a plurality of labeled training datasets, wherein, for each labeled training dataset, labels of the training dataset indicate, for associated portions of data in the labeled training dataset, a corresponding domain; and perform machine learning training of a domain classifier machine learning model based on the labeled training datasets to generate a trained domain classifier, wherein the trained domain classifier performs the domain classification operation on data elements of the new dataset.

13. The computer program product of claim 12, wherein one or more of the labeled training datasets comprises a mixed domain labeled training dataset having at least two portions of data associated with at least two different domains.

14. The computer program product of claim 11, wherein the computer readable program further causes the computing device to perform the subsequent AutoML process on the new dataset at least by:
performing a domain classification operation on data elements of the new dataset to identify which domains in the plurality of domains are represented in the new dataset;
retrieving, from the data structure, entries corresponding to the domains represented in the new dataset; and
configuring the AutoML logic based on the retrieved entries corresponding to the domains represented in the new dataset.

15. The computer program product of claim 11, wherein the computer readable program further causes the computing device to configure the AutoML logic based on the retrieved entries corresponding on the domains represented in the new dataset at least by:
determining a cross-domain default value for the parameter based on a first statistical function of the cross-dataset default values for the domains represented in the new dataset;
determining a cross-domain value range for the parameter based on a second statistical function of the cross-dataset value ranges for the domains represented in the new dataset; and
configuring parameter sampling logic of the AutoML logic with the cross-domain default value and cross-domain value range.

16. The computer program product of claim 15, wherein the first statistical function is a weighted mean of the cross-dataset default values for the domains represented in the new dataset, wherein the weights in the first statistical function are determined based on a relative representation of the domain in the new dataset, wherein the second statistical function is a weighted mean of the cross-dataset value ranges, wherein the weights in the second statistical function are determined based on a relative representation of the domain in the new dataset.

17. The computer program product of claim 14, wherein the computer readable program further causes the computing device to configure the AutoML logic based on the retrieved entries at least by:
performing a cross-domain analysis of the derived cross-dataset default value and derived cross-dataset value range for the domains represented in the new dataset, to generate updated parameter sampling configuration data; and
updating a configuration of the AutoML logic to utilize the updated parameter sampling configuration data to perform the subsequent AutoML process.

18. The computer program product of claim 11, wherein the computer readable program further causes the computing device to generate the derived cross-dataset default value and derived cross-dataset value range at least by, for each domain in the plurality of domains:
determining the derived cross-dataset default value as a first statistical function of a plurality of learned values for the parameter, for the domain, generated by the AutoML logic during the initial AutoML process; and
determining the derived cross-dataset value range comprises determining a lower bound as a second statistical function of the derived cross-dataset default value, and determining an upper bound as a third statistical function of the derived cross-dataset default value.

19. The computer program product of claim 18, wherein the first statistical function is a weighted mean of the plurality of learned values, wherein the weights in the weighted mean are determined based on a relative representation of the domain in a corresponding dataset, wherein the second statistical function is a difference of the derived cross-dataset default value and one or more standard deviations of the plurality of learned values, and wherein the third statistical function is a sum of the derived cross-dataset default value and one or more standard deviations of the plurality of learned values.

20. An apparatus comprising:
a processor; and
a memory coupled to the processor, wherein the memory comprises instructions which, when executed by the processor, cause the processor to:
configure automated machine learning (AutoML) logic of the apparatus based on an initial default value and initial range for parameter sampling of a parameter of a machine learning model;
execute an initial AutoML process on the machine learning model based on a plurality of datasets comprising a plurality of domains of data elements, utilizing the initially configured AutoML logic;
generate, for each domain in the plurality of domains, a derived cross-dataset default value and derived cross-dataset value range derived from results of the execution of the initial AutoML process;
store, for each domain in the plurality of domains, an entry of a data structure comprising the derived cross-dataset default value and cross-dataset value range for the domain; and
perform, by the AutoML logic, a subsequent AutoML process on a new dataset based on one or more entries of the data structure.

* * * * *